United States Patent [19]

Breithaupt

[11] Patent Number: 5,001,607
[45] Date of Patent: Mar. 19, 1991

[54] TANTALUM CAPACITOR WITH NON-CONTIGUOUS CATHODE ELEMENTS AND METHOD FOR MAKING

[75] Inventor: Stephen C. Breithaupt, North Bennington, Vt.

[73] Assignee: Tansistor Electronics, Inc., Bennington, Vt.

[21] Appl. No.: 434,872

[22] Filed: Nov. 13, 1989

[51] Int. Cl.[5] .............................................. H01G 9/00
[52] U.S. Cl. ................................... 361/516; 29/25.03
[58] Field of Search ............... 29/570.1; 361/503, 508, 361/509, 510, 516

[56] References Cited

U.S. PATENT DOCUMENTS

| | | | |
|---|---|---|---|
| 2,743,399 | 4/1956 | Bujan | 29/570.1 |
| 3,349,295 | 10/1967 | Sparkes | 361/509 |
| 4,024,625 | 5/1977 | England | 29/570.1 |
| 4,479,168 | 10/1984 | Green | 29/570.1 X |

Primary Examiner—Donald A. Griffin
Attorney, Agent, or Firm—Ratner & Prestia

[57] ABSTRACT

A capacitor having non-contiguous cathode elements prepared by diffusion bonding size-reduced cathode elements to a case.

16 Claims, 2 Drawing Sheets

TANTALUM CAPACITOR WITH NON-CONTIGUOUS CATHODE ELEMENTS AND METHOD FOR MAKING

BACKGROUND OF THE INVENTION (1) Field of the Invention

This invention pertains to capacitors, particularly to tantalum capacitors having a non-contiguous arrangement of cathode elements.

(2) Description of Related Art

Tantalum capacitors are highly regarded for their electrical and physical characteristics. Typical wet tantalum capacitors have porous anodes which are housed in a tantalum case and hermetically sealed. Such capacitors are well suited for use in military and industrial circuits that demand quality and reliability in filtering, bypass, coupling, storage and timing applications. They are designed for reliable service over the temperature range of $-55°$ C. to $+125°$ C., and therefore meet the needs of the avionics and aerospace industry.

Among the premium capacitors of this type are the PuriTan ™ capacitors available from Tansitor Electronics Inc., Bennington, Vt. Due to their superior ripple capabilities, PuriTan ™ capacitors are exceptionally well suited for filtering in switching regulator applications, an area where conventional wets are not normally used, due to the relative high ripple current ratings required.

These capacitors are usually fabricated by inserting a preformed cylinder of tantalum into a tantalum can. The cylinder serves as the cathode in the completed device. A tantalum anode, electrolyte, and suitable sealing and connecting means complete the construction. For many applications, however, it is not necessary to have as much cathode capacitance as is provided by the full cathode cylinder, particularly in view of the high cost of tantalum. An obvious solution to this problem is to form a thinner cathode cylinder. Unfortunately, thin cylinders of tantalum are very difficult to both make and handle. Losses due to breakage more than compensate for any savings expected from the use of thinner cylinders.

There remains, then, a need for a tantalum capacitor in which the cathode capacitance can be tailored to meet the needs of the user, and yet can be fabricated on existing equipment and in conventional forms for use by the industry.

SUMMARY OF THE INVENTION

A capacitor having non-contiguous cathode elements mounted in and adhered to a case is provided. The total cathode capacitance is determined by the total number of cathode elements used, ranging from a minimum of two to as many as are required to fill the capacitative area of the case.

Also provided is a new means of inserting the cathode elements into the case by forcing preformed elements through a reducer of diameter slightly less than that of the preformed elements.

DETAILED DESCRIPTION OF THE INVENTION

Referring now to FIG. 1, a fully constructed capacitor 10 is illustrated in a cut-away side view showing the arrangement of cathode elements 30 in the can. Can 20 is a conventional cylindrical tantalum can which serves as the outer casing of the capacitor. In fully assembled form, the can is sealed at the top and provided with leads at each end for making electrical connections. Typical constructions are shown in U. S. No. 4,780,797—Libby and U.S. No. 4,523,255—Rogers, the disclosures of which are incorporated by reference herein. It is understood, however, that this invention is in no way limited by the sealing or connecting features of the art, or by the particular configuration or size of the fully assembled capacitor. Further, although this invention is described by reference to tantalum capacitors, other materials, such as carbon or alternative valve metals, may be substituted for tantalun in the practice of the invention.

Figure 1A:
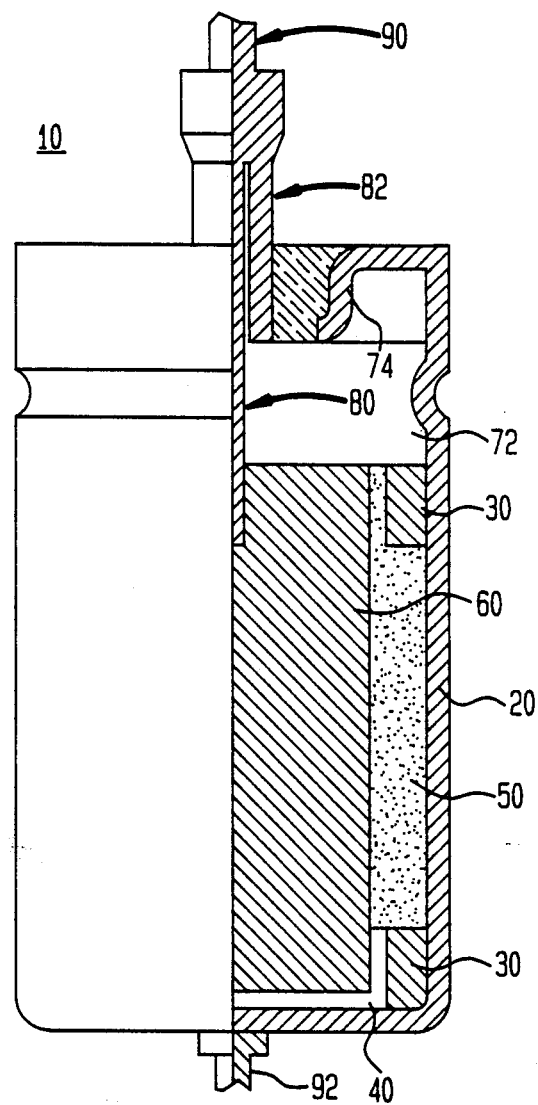
FIG. 1a is a partially cut-away side view of a capacitor of this invention with two non-contiguous cathode elements.
Figure 1B:
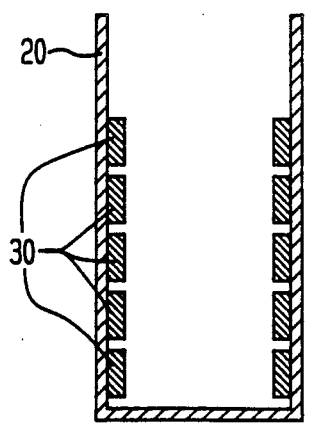
FIGS. 1b, 1c, 1d illustrate alternative embodiments with five, four, and three elements, respectively.
Figure 1C:
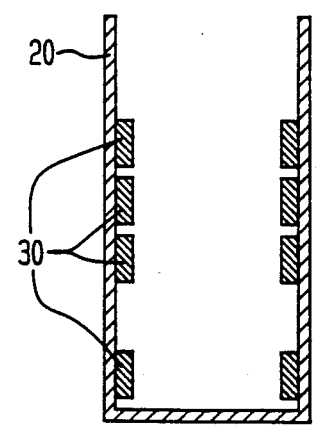
Figure 1D:
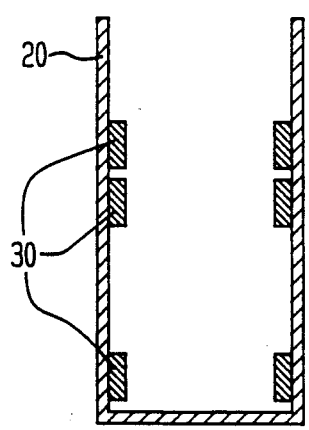

Preformed cylindrical tantalum cathode elements 30 are inserted into can 20. The elements 30 may be located at only the bottom and top of the can as shown in FIG. 1a or may be distributed in a variety of arrangements as shown in FIGS. 1b, c, and 1d. The choice of number of elements is controlled by the desired cathode capacitance and the height of the cylindrical elements. It is not necessary that the cathode elements all be of the same height. The selection of the number and size of the elements is well within the purview of the skilled artisan.

Cathode elements 30 may be slip fit or impacted into the can 20, a practice which is widely employed in the art for the insertion of cathode cylinders. Subsequent sintering or laser welding is required to adhere the cathode elements to the wall of can 20. In the preferred embodiment, denoted enhanced cathode bonding, the cathode elements 30 are inserted into can 20 through a reducer of slightly smaller diameter than either the cathode elements or the can. This process is explained more fully below.

An electrolyte, such as 38 % $H_2SO_4$, is introduced into region 50. Tantalum anode 60, with insulator 40 attached, is inserted into the can. Any suitable insulating material may be used; for many applications, a polytetrafluoroethylene insulator is preferred. The active area is then sealed from the environment with suitable sealing means. A tantalum riser wire 80 protrudes through the sealing means to connect anode 60 to a lead wire 90.

In one embodiment, the finished capacitor is crimped in the region of spacer 72 and topped with a laser welded tantalum-to-glass-to-tantalum seal 74. The tantalum riser wire 80 passes through the glass in a tantalum tube 82, the riser and tube are welded closed, and that weld is in turn welded to a tinned nickel lead 90, thereby providing electrical connection for anode 60. A tinned nickel lead 92 is welded to the bottom of can 20 to provide electrical connection for the cathode. It is to be understood that none of these specifically recited sealing and connecting means are limiting, as the cathode construction of this invention will find use with alternative sealing and connecting means.

In the practice of this invention, it is preferred that the cathode elements be adhered to the can by the enhanced cathode bonding method alluded to above. In this method, a cathode element preform is inserted into a can before springback acts to relieve the stresses introduced during pressing of the preform. Subsequent sintering provides a diffusion bond between the cathode element and the can wall. Such a bond is markedly stronger than that provided by the slip fit/sintering method of the art, or even that of laser welding. Capacitors prepared by this method are expected to be less prone to come apart under stress, and thus represent a significant advance in the art of capacitor fabrication.

Figure 2:
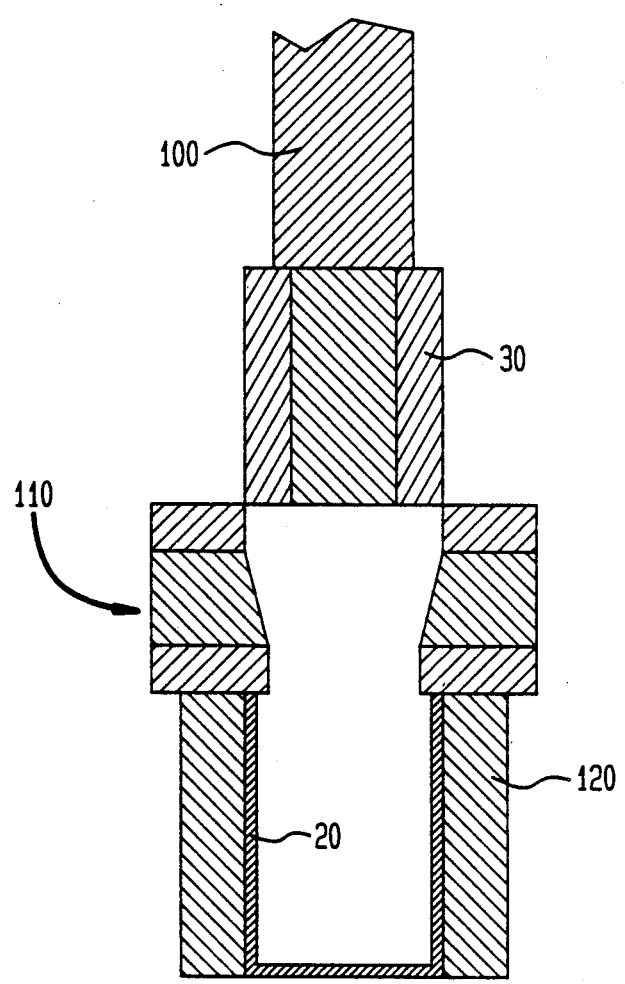
FIG. 2, is a cut-away side view of the arrangement for insertion of a cathode element into a can through a reducer.

Referring now to FIG. 2, a cylindrical cathode element 30, formed from tantalum powder and up to about 8 % of a suitable binder/lubricant, such as camphor, salicylic acid, or stearic acid is driven by punch 100 through an annulus in cylindrical reducer 110 into tantalum can 20 in can holder 120. Reducer 110 has an inside diameter slightly less than the outside diameter of cathode element 30, forcing the element 30 into a more compressed state. The walls of reducer 110 are tapered to permit a gradual progression in compressive force as element 30 moves through the reducer. The inside diameter of can 20 is slightly greater than the inside diameter of reducer 110 (and the outside diameter of compressed cathode element 30 exiting the reducer) so that stress relief can occur during subsequent processing. Generally, the inside diameter of the reducer is about 0.1 % to 2.5 % less than the outside diameter of the preformed element. Preferably, the inside diameter of the reducer is from about 0.5 % to about 1.5 % less than the outside diameter of the preformed element.

After insertion of the element 30 into can 20 through reducer 110, the assembly is placed in an oven maintained at 200–400° C. for up to about two hours to remove the binder/lubricant. This delubing step begins the process of stress relief on the cathode element 30. The element is cooled to room temperature and then transferred to a vacuum sintering furnace maintained at about 1500° C. for about thirty minutes. Bonding between the can wall and the cathode element begins at about 950° C. However, the radial stresses are not fully relieved until a temperature of about 1200° C. is reached. As this latter temperature is approached, the cathode begins to diffusion bond to the can wall. At about 1350° C., the cathode element begins to shrink, but, due to the strength of the diffusion bond, all shrinkage occurs from the inside out. Those skilled in the art will recognize that the process of this invention is equally applicable to the insertion of a single monolithic cathode element section or the insertion of multiple non-contiguous element.

The invention has been described as a tantalum capacitor and method for making in the best mode known to applicant, however, it will be apparent that myriad variations and perturbations are within the purview of the skilled artisan and such are considered equivalents of the invention as herein described and claimed.

What is claimed is:

1. An electrolytic capacitor having, in cooperative combination, a metal case, a porous pellet anode, an electrolyte, and a segmented cathode comprising at least two non-contiguous cathode elements adhered to the interior of said case, each of said cathode elements in cylindrical form, one of said cathode elements located at one end of said case and one other of said cathode elements located at the other end of said case.

2. A capacitor of claim 1 having two cathode elements, one at one end of the case, the second at the other end of the case.

3. A capacitor of claim 1 in which said cathode elements are separated from each other by a distance at least as great as the height of either section.

4. A capacitor of claim 1 having a plurality of non-contiguous cathode elements.

5. A capacitor of claim 1 in which said cathode segments are of different heights.

6. A capacitor of claim 1 in which said cathode elements are diffusion bonded to the wall of said case.

7. A capacitor of claim 1 in which said cathode elements are tantalum elements, said anode is tantalum, and said case is a tantalum can.

8. A wet tantalum electrolytic capacitor comprising, in cooperative combination, a tantalum case having at least one open end and having cathode lead means attached thereto, a plurality of cylindrical non-contiguous tantalum cathode elements adhered to the interior wall of said case, an electrolytic solution substantially filling the case, a tantalum anode disposed within said case and separated therefrom and from the non-contiguous cathode elements by an insulating support, said anode having anode lead means attached thereto, and means for sealing said open end.

9. A capacitor of claim 8 in which said case is in the form of a can.

10. A counterelectrode for a tantalum capacitor comprising cylindrical non-contiguous tantalum cathode elements bonded to the interior wall of a tantalum can.

11. A process for preparing a wet electrolytic capacitor comprising inserting at least one preformed cylindrical cathode element into a capacitor case through a cylindrical reducer of inside diameter less than the outside diameter of the preformed cathode element, heating said cathode-case assembly to a temperature sufficient to diffusion bond said cathode element to the interior wall of said case, and introducing and cooperatively attaching insulator means, an anode, an electrolyte, sealing means, and electrical connector means.

12. A process of claim 11 in which a plurality, of cathode elements are inserted into the case.

13. A process of claim 11 in which the inside diameter of the reducer is from about 0.1 % to about 2.5 % smaller than the outside diameter of the preformed cathode element.

14. A process of claim 11 in which the case is a tantalum case and the cathode elements are tantalum cathode elements.

15. A process of claim 14 in which the cathode-case assembly is heated to at least 1400° C. for at least 30 minutes.

16. A process for forming a counterelectrode for a tantalum capacitor comprising inserting a preformed tantalum cathode element into a tantalum can through a reducer of inside diameter less than that of the outside diameter of the preformed element and heating said assembly at a temperature sufficient to induce diffusion bonding of the element to the can.

* * * * *